United States Patent
Krysak

(10) Patent No.: US 8,393,303 B1
(45) Date of Patent: Mar. 12, 2013

(54) LEG PROTECTIVE SHIELDS FOR TREATING WOUNDS OF AN ANIMAL

(76) Inventor: David Matthew Krysak, Washington, DC (US)

( * ) Notice: Subject to any disclaimer, the term of this patent is extended or adjusted under 35 U.S.C. 154(b) by 0 days.

(21) Appl. No.: 13/267,806

(22) Filed: Oct. 6, 2011

(51) Int. Cl.
A01K 13/00 (2006.01)

(52) U.S. Cl. ........ 119/850; 119/714; 119/726; 119/725; 119/810; 119/816; 119/818

(58) Field of Classification Search ................ 119/850, 119/856, 815, 728, 855, 714, 726, 725, 755, 119/810, 816, 818, 853, 854, 868; D30/145–150; 54/82, 79.2, 79.1, 80.1; 36/111
See application file for complete search history.

(56) References Cited

U.S. PATENT DOCUMENTS

| | | | | |
|---|---|---|---|---|
| 1,073,478 A | * | 9/1913 | Dodd | 128/881 |
| 3,747,565 A | * | 7/1973 | Kellam | 54/82 |
| 3,918,238 A | * | 11/1975 | Iozzio | 54/79.2 |
| 4,737,400 A | * | 4/1988 | Edison et al. | 442/151 |
| 4,744,333 A | | 5/1988 | Taylor | |
| 5,076,043 A | | 12/1991 | Butler | |
| 5,137,508 A | | 8/1992 | Engman | |
| 5,341,765 A | | 8/1994 | McComb | |
| 5,495,828 A | * | 3/1996 | Solomon et al. | 119/850 |
| D375,586 S | * | 11/1996 | Caditz | D30/146 |
| D376,448 S | * | 12/1996 | Caditz | D30/146 |
| 5,676,095 A | * | 10/1997 | Ralls | 119/850 |
| 6,223,696 B1 | * | 5/2001 | Murakami | 119/850 |
| 6,240,882 B1 | * | 6/2001 | Gross | 119/850 |
| 6,564,753 B1 | | 5/2003 | Heileg et al. | |
| 6,595,162 B1 | * | 7/2003 | Hibbert | 119/850 |
| 7,802,542 B1 | * | 9/2010 | Zimmerman | 119/850 |
| 2006/0180098 A1 | * | 8/2006 | Yung et al. | 119/850 |
| 2008/0022945 A1 | * | 1/2008 | Hughes et al. | 119/850 |
| 2011/0209673 A1 | * | 9/2011 | Weyerman | 119/856 |
| 2012/0247399 A1 | * | 10/2012 | Rivera-Brutto | 119/850 |

\* cited by examiner

*Primary Examiner* — Andrea Valenti

(57) ABSTRACT

A protective shield for an animal comprised of two sleeves connected by a strap which extends across the animals back. The sleeves and strap are made from a continuous blank of elastic fabric which allows flexibility, ensures a secure fit and conforms the to the animal's body.

5 Claims, 3 Drawing Sheets

LEG PROTECTIVE SHIELDS FOR TREATING WOUNDS OF AN ANIMAL

REFERENCES CITED

Not Applicable.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

SEQUENCE LISTING

Not Applicable.

BACKGROUND OF THE INVENTION

1. Prior Art

The following is a tabulation of some prior art that presently appears relevant:

| U.S. Patents | | | |
|---|---|---|---|
| Pat. No. | Kind Code | Issue Date | Patentee |
| 6,595,162 | B1 | Jul. 22, 2003 | Hibbert |
| 6,564,753 | B1 | May 20, 2003 | Heileg et al. |
| 6,240,882 | B1 | Jun. 5, 2001 | Gross |
| 5,341,765 | | Aug. 30, 1994 | McComb |
| 5,137,508 | | Aug. 11, 1992 | Engman |
| 5,076,043 | | Dec. 31, 1991 | Butler |
| 4,744,333 | | May 17, 1998 | Taylor |

2. Field of the Invention

The patent invented generally relates to a body-carried protective shield for protecting areas of an animal's forelegs.

Domestic animals, such as canines, often develop skin allergies which lead to excessive licking, biting and scratching causing localized injures to the animal. The behaviors are more evident in the forelegs of the animal and can be exacerbated, by an increase in the stress level of the animal, wherein the aforementioned can lead to raw skin and open wounds. The injuries may require professional veterinary attention resulting in the prescription of topical ointments or dressing bandages. The healing of the injury and/or odor of the topical ointment can result in the animal licking the affected regions.

The invention was created out of necessity for a particular case. The case was a mixed breed canine which developed an allergy to certain food proteins at an early age. These allergies were manifested in the licking and biting of the animals forelegs. The application of the protective shield resulted in an unexpected result, the animal ceased to lick the affected region allowing the wound to heal.

DESCRIPTION OF RELATED ART

The prior art discloses protective and therapeutic devices for the animal. One such device is shown in U.S. Pat. No. 6,564,753 issued to Heileg et al. which discloses an apparatus used to protect and cover elbow calluses on the front legs of the animal. The device is made from a dense material and utilizes a complex fastening system to attach the device to the animal. A disadvantage with the devise is the dense material used for padding; the material restricts movement of the animal's leg once the device extends beyond the elbow of the leg. Another disadvantage of the device requires a complex fastening system which is cumbersome for the animal. Yet another disadvantage for the device is a hook and loop fastening system used to close the leg wraps. The fastening system may become disconnected through high activity of, or chewing from, the animal.

A similar device is disclosed in U.S. Pat. No. 6,240,882 issued to Gross which discloses a protective garment for the animal's legs that receive padding and hot or cold packs to treat the animal's joints. A disadvantage of this device is that each leg sleeve is attached to the other with the use of a hook and loop fastening system. The fastening system can become disconnected though rolling of the animal leaving each sleeve vulnerable to slide off the animal's leg as the sleeves are codependent. Yet another disadvantage of the device is the thick material used and the layers of fabric required to form the pockets, which result in unneeded bulk, complexity of construction and stress on the animal.

A similar device is disclosed in U.S. Pat. No. 5,341,765 issued to McComb which discloses a protective garment for the animals front legs made from a double-layered fabric. A disadvantage of this device is the method which the leg holsters are formed, which requires the fabric to be twisted to form a conical holster. The twisting imparted induces a torsional movement in the holsters, rotating the holster around the animals leg, as tension is applied to the strap connecting the holsters to one another. Further to combat this torsional movement the device embodies a secondary strap under the animal's chest a further disadvantage which adds additional bulk and complexity, The prior art disclosed does not specifically address the aforementioned problem. The prior art disclosed are large, cumbersome and require extensive manufacturing due to their complexity. Further the nature of the prior art disclosed is therapeutic and directed to the animal's joints or elbows. Consequently, a need still exists for a protective shield comprising two sleeves which extend the length of the entire leg, are adjustable, uncomplicated to use, reusable and easily manufactured.

BRIEF SUMMARY OF THE INVENTION

In accordance with one embodiment, a shield comprised of a pair of connected sleeves the animal wears on its forelegs made from a single piece of elastic fabric.

Accordingly several advantages of one or more aspects are as follows: to provide a single-layered protective shield which is made from a continuous piece of fabric, that is flexible; that does not impede the animals movement; that is designed to provide continuous support by eliminating torsional movement; and that is made from flexible material which allows for variations of the animals shoulder size and allows for secure and comfortable fit whether the animal is in motion or at rest. These and other advantages of one or more aspects will become apparent from a consideration of the ensuing descriptions and accompanying drawings.

DETAILED DESCRIPTION OF THE INVENTION

Figure 1:
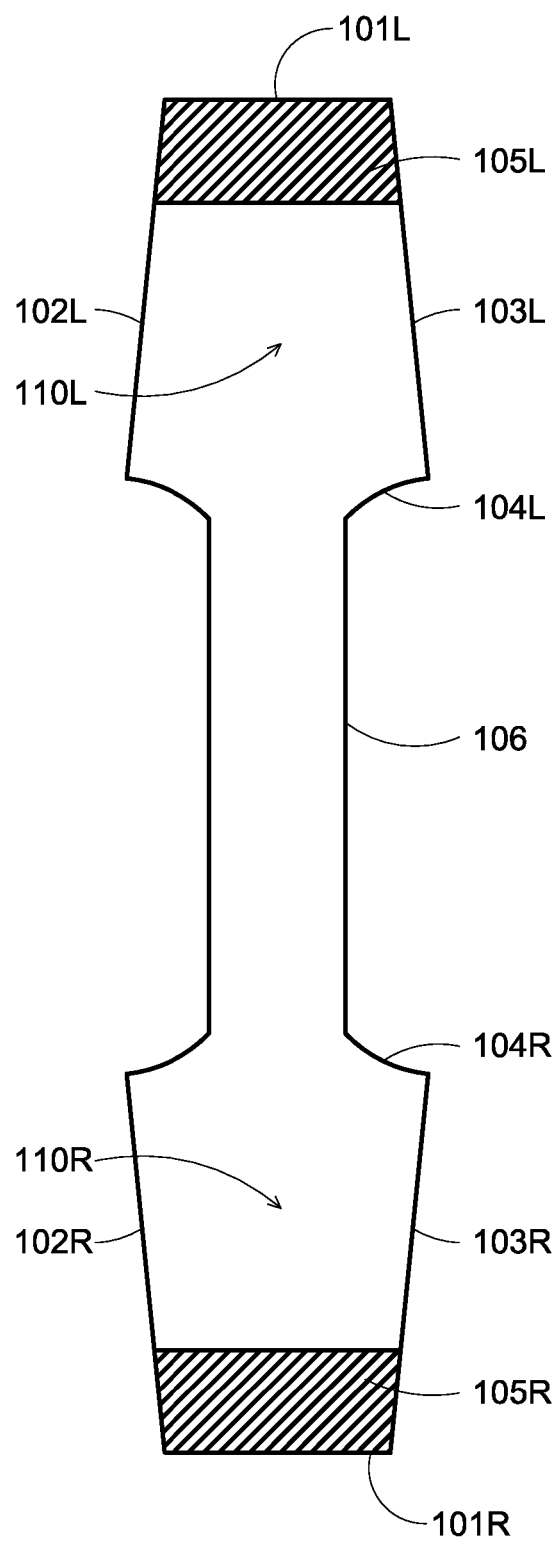
FIG. 1 shows various aspects of the shield blank

Referring to the drawings, and particularly FIG. 1 generally depicts the fabric blank of one embodiment. The term "blank" refers to the rough cut fabric prior to assembly. The blank is cut from fabric to form the general shape depicted, and comprised of sleeve blank 110L and 110R as connected by strap 106. Prior to assembly, and excluding edge 102L, 103L, 102R and 103R, the raw edges of the blank are seamed. The term seam is used herein to refer any fabrics treatment that prevents the fabric from which the embodiment is fabricated from running or otherwise fraying. The seaming may be formed by such methods as sewing, knitting or special weave.

Figure 2:
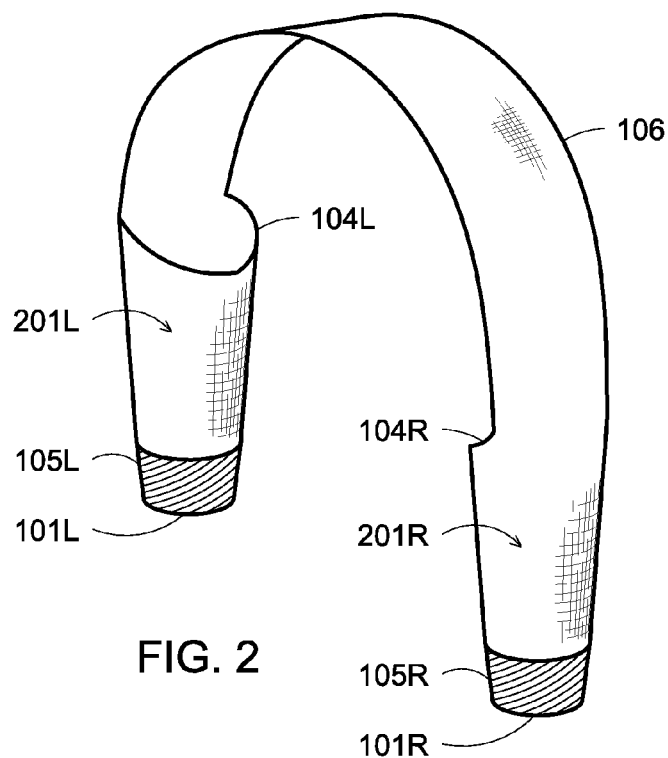
FIG. 2 shows one embodiment of the shield as assembled
Figure 4:
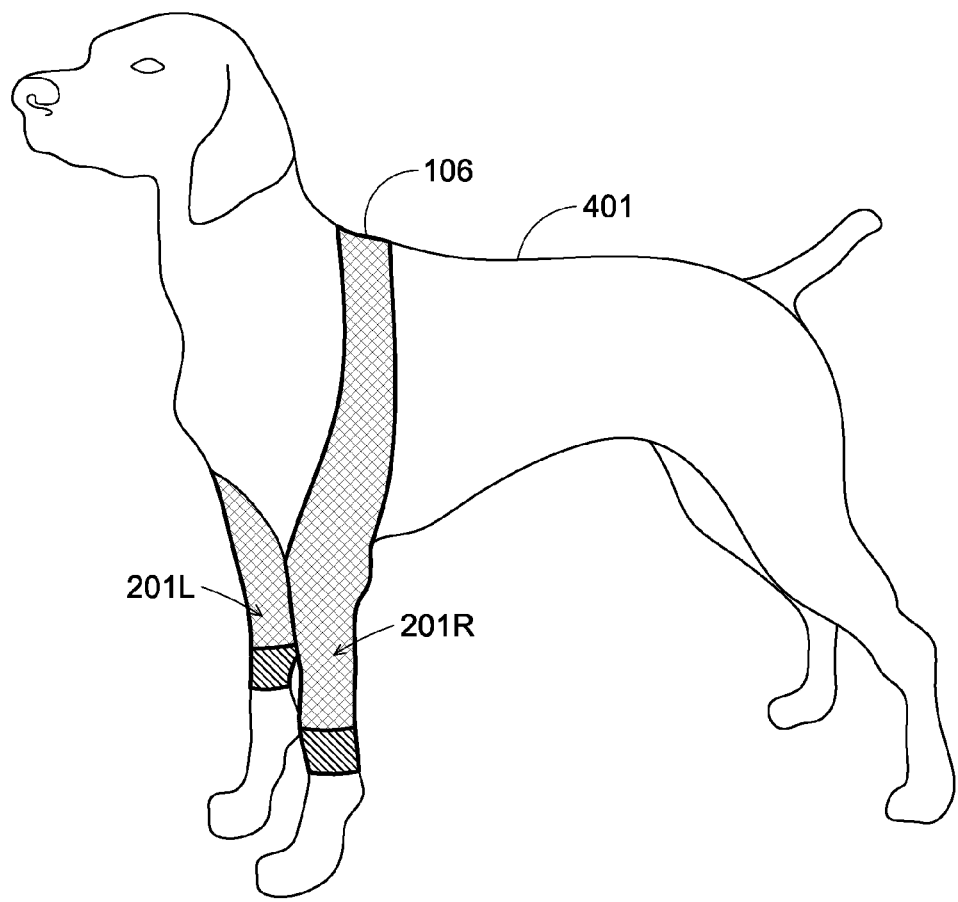
FIG. 4 shows one embodiment of the shield from FIG. 2 as worn by a canine

FIG. 2 depicts the complete assembly of one embodiment. Sleeve 201L is made by seaming edge 102L and 103L together to form a conical sleeve as depicted in FIG. 2 wherein edge 104L is larger in circumference then edge 101L. Similarly sleeve 201R is made by seaming edge 102R and 103R together to form a conical sleeve as depicted in FIG. 2 wherein edge 104R is larger in circumference then edge 101R. Referring to FIG. 1, the shape of sleeve blank 110L and 110R are designed to ensure strap 106 is integrated in to each sleeve to maintain consistent tension through the primary axis across the back of animal 401 as depicted in FIG. 4. Referring to FIG. 1 the term "primary axis" refers to the perpendicular axis between edge 101L and 101R, wherein the term "secondary axis" refers a direction perpendicular that of the primary axis. The utility of strap 106 into said sleeve is the advantage of removing tortional movement generated in the sleeves created by rolling, jumping, running or related activity levels of the animal. Additionally, as seen in FIG. 1 the edge 104L and 104R are scalloped, or shaped to conform to the under-pit of the animal's leg to ensure a secure fit.

The single layered fabric from which one embodiment is made must stretch and then recover to its original shape in order to snugly conform to the leg of the animal 401 as depicted in FIG. 4. The fabric shall stretch in four-ways, both in the primary axis and secondary axis. The stretch of the fabric is determined by the weave and material employed to make the fabric, and generally comprised of a knitted cotton and elastic fiber blend. The elastic material preferably is a fiber comprising a natural rubber or synthetic rubber core to which is bonded a material such as nylon, cotton and/or polyester. Commonly available elastic materials are Lycra, Spandex, or equivalents thereof. An advantage to said fabric is its breathability, which allows air movement over the affected area of the legs, allowing vapor to escape and the wound to heal naturally.

The cotton and elastic materials are preferably knitted together to form an acceptable fabric, preferably a ribbed knit. Knitting of the materials is preferable because knitting forms connected loops and ribs that create the desired memory and recovery properties.

FIG. 2 depicts one embodiment which includes a treated portion 105L of sleeve 201L and 105R of sleeve 201R. The treated portion 105L and 105R are located between edge 101L and 104L of sleeve 201L and similarly edge 101R and 104R of sleeve 201R as depicted in FIG. 2. Portion 105L and 105R are treated to generally stabilize the fabric and prevent the fabric from fraying. A liquid is sprayed or applied to the fabric which dries to form said treated portions. An advantage from treated portion 105L and 105R is sleeve 201L and 201R can be adjusted in the primary axis by cutting the sleeves to fit the length of the specific animal.

The combination of the single-layered four-way stretch fabric and the treated portion 105L and 105R can greatly reduce the amount of sizes required to fit the majority of animals. The fabric is advantageous in that it allows for a loose knit resulting in sleeve 201L and 201R which conform to a large variation in the leg circumferential dimension of the animal. Generally, the canine's forelegs are rather uniform in circumferential dimension from the knee to the ankle, and generally only vary in length proportionately to the circumferential dimension allowing the sleeves to utilize the treated portion for final adjustments. Additionally the fabric allows for stretch of strap 106 in the primary axis across the back of the animal 401, accommodating a variety of shoulder and back sizes. The aforementioned advantages result in lower fabrication and inventory costs by reducing the amount of sizes and potential inventory that must be maintained.

Referring to FIG. 4 the shield is applied to the animal 401 by first orientating the shield as depicted with strap 106 across the shoulder of the animal 401 with sleeve 201L and 201R facing inward toward the chest of the animal 401. Either sleeve 201L or 201R is placed on the animal 401 by sliding the sleeve's onto the animals legs one at a time and pulling the sleeve's up to the animal's under-pit. Once said sleeve's are secured to the animals under-pit, strap 106 is stretched, pulled over the animals head and placed on the animals shoulders and back as depicted in FIG. 4.

Figure 3:
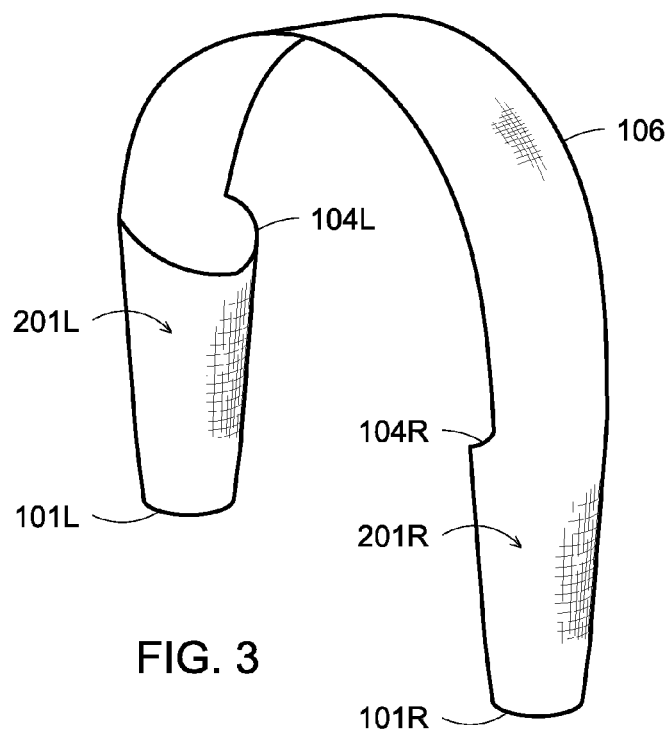
FIG. 3 shows yet another embodiment of the shield as assembled

FIG. 3 depicts another embodiment of said sleeves wherein sleeve 201L and 201R are absent of portion 105L and 105R as described in other embodiments. This embodiment is constructed and operated in the same manner as previously described. An advantage of this embodiment is said shield can be manufactured more cost effectively without the need for a chemical treatment.

The shield can be made in a variety of sizes and proportions. Each of said sleeves can be made in a variety of diameters and lengths to accommodate a variety of animal sizes. The connective strap can be made in a in a variety of lengths and widths to accommodate a variety of animal sizes.

Accordingly the shield of the various embodiments can be used to provide a single-layer barrier to prevent further aggravation to the injury of the animal. The shield is made from a continuous fabric blank, flexible, does not impede the animal's natural movements and accommodates a variety of animal sizes. Furthermore, the shield has the additional advantages in that:

It provides a flexible barrier that is breathable, reusable and machine washable;

It provides sleeves that are circumferential elastic around, as well as laterally along the length of the animal's forelegs;

It provides sleeves that independently conform to specific contours of the animal's forelegs which ensures a secure fit and allows for variations in size of the animals forelegs;

It provides a connecting strap that is elastic allowing the strap to conform to the animal back regardless of the activity level;

It provides a portion of the sleeves that have been treated to seal the fabric which allows for independent adjustment of each sleeves length.

Although the description above contain many specifications, these should not be construed as limiting the scope of the embodiments but merely providing illustrations of several embodiments. Many other variations are possible. For example the sleeves may have other shapes; the shoulder strap

The invention claimed is:

1. The article of manufacture claimed is a protective shield for animal forelegs comprising:
   a. a blank made from a continuous piece of single layered fabric including two sleeves and a strap thereby connecting said sleeves in a primary axis,
   b. said strap of predetermined length in said primary axis scalloped continuously uniform predetermined width in the secondary axis perpendicular to said primary axis,
   c. said sleeves of predetermined increased width in said secondary axis of said strap at each end of said strap for a predetermined length of said strap in said primary axis thereby forming two opposing edges,
   d. said sleeves further characterized by a seaming of said edges thereby forming two conical shaped sleeves at each end of said strap,
   e. said sleeves further characterized by scalloped edges located adjacent to said strap thereby transitioning said strap in said primary axis to said sleeve in said secondary axis,
   f. whereby said blank comprising said strap, said sleeves and said seaming form a resiliently stretchable and structurally integrated protective shield for said animal's forelegs wherein no additional straps are required to attach to said animal,
   g. said sleeves characterized by treated portions of predetermined length in said primary axis and said secondary axis, wherein said treatment is a liquid fabric stabilizer and upon drying allows a length of said sleeve to be adjusted in said primary axis by cutting to fit the length of a specific animal and reduces fraying.

2. A protective shield for an animal's forelegs as recited in claim 1, wherein said fabric is comprised of elastic material of predetermined resilience.

3. A protective shield for an animal's forelegs as recited in claim 1, wherein said fabric is comprised of four-way stretch fabric.

4. The article of manufacture claimed is a protective shield for animal forelegs comprising:
   a. a blank made from a continuous piece of single layered resiliently stretchable fabric including two sleeves and a strap thereby connecting said sleeves,
   b. said strap of predetermined length in said primary axis and a continuously uniform predetermined width in the secondary axis perpendicular to said primary axis,
   c. said sleeves of predetermined width greater then said strap in said secondary axis of said strap located at each end of said strap for a predetermined length of said strap in said primary axis thereby forming two opposing edges,
   d. said sleeves further characterized by a seam comprised of sewing, knitting, or special weaving thereby forming two conical shaped sleeves at each end of said strap, wherein said sleeves snuggly conform to a variety of different shaped legs of a variety of different animals,
   e. said sleeves further characterized by scalloped edges located adjacent to said strap thereby transitioning said strap in said primary axis to said sleeve in said secondary axis,
   f. whereby said blank comprising, said strap, said sleeves and said seams form a resiliently stretchable and structurally integrated protective shield for said animal's forelegs wherein no additional straps are required to attach to said animal.

5. A protective shield for an animal's forelegs as recited in claim 4, wherein said fabric is comprised of elastic material of predetermined resilience.

* * * * *